(12) United States Patent
Albright

(10) Patent No.: US 7,201,962 B2
(45) Date of Patent: *Apr. 10, 2007

(54) HEMOCOMPATIBLE COATED POLYMER AND RELATED ONE-STEP METHODS

(75) Inventor: Robert L. Albright, Southampton, PA (US)

(73) Assignee: Medasorb Corporation, Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,249

(22) Filed: Mar. 16, 2005

(65) Prior Publication Data

US 2005/0159508 A1    Jul. 21, 2005

Related U.S. Application Data

(63) Continuation of application No. 10/273,249, filed on Oct. 18, 2002, now Pat. No. 6,885,829.

(51) Int. Cl.
| | | |
|---|---|---|
| B32B 7/04 | (2006.01) | |
| B32B 23/08 | (2006.01) | |
| B32B 27/08 | (2006.01) | |
| B32B 27/26 | (2006.01) | |
| B32B 27/30 | (2006.01) | |

(52) U.S. Cl. .................... 428/407; 428/403; 428/507; 428/514; 428/515; 428/520; 428/522; 523/201; 523/202; 523/205; 523/206; 521/65; 521/69; 521/70; 521/72; 427/213.35; 427/213.36

(58) Field of Classification Search .................. None
See application file for complete search history.

(56) References Cited

U.S. PATENT DOCUMENTS

| | | | | |
|---|---|---|---|---|
| 3,957,741 | A | * | 5/1976 | Rembaum et al. .......... 526/312 |
| 4,046,720 | A | * | 9/1977 | Rembaum et al. .......... 521/147 |
| 4,140,652 | A | * | 2/1979 | Korshak et al. ............ 525/54.1 |
| 4,171,283 | A | * | 10/1979 | Nakashima et al. ........ 502/402 |
| 4,232,004 | A | * | 11/1980 | Dodd ...................... 424/227.1 |
| 4,435,524 | A | * | 3/1984 | Dinbergs ..................... 521/65 |
| 4,634,604 | A | * | 1/1987 | Tlustakova et al. .... 427/213.33 |
| 5,013,585 | A | * | 5/1991 | Shimizu et al. ............. 427/220 |
| 5,064,668 | A | * | 11/1991 | Klemann et al. ........... 426/271 |
| 5,169,754 | A | * | 12/1992 | Siiman et al. .................. 435/5 |
| 5,326,738 | A | * | 7/1994 | Sandoval et al. ........... 502/401 |
| 5,331,027 | A | * | 7/1994 | Whitbourne ................. 524/37 |
| 5,547,575 | A | * | 8/1996 | Demmer et al. ............ 210/490 |
| 5,563,214 | A | * | 10/1996 | Share et al. ................. 524/809 |
| 5,589,396 | A | * | 12/1996 | Frye et al. ..................... 436/73 |
| 5,633,316 | A | * | 5/1997 | Gartner et al. ............ 525/54.32 |
| 5,639,620 | A | * | 6/1997 | Siiman et al. ............. 435/7.21 |
| 5,683,800 | A | * | 11/1997 | Stringfield et al. ........ 428/318.4 |
| 5,773,384 | A | * | 6/1998 | Davankov et al. .......... 502/402 |
| 5,776,706 | A | * | 7/1998 | Siiman et al. ............. 435/7.21 |
| 5,807,636 | A | * | 9/1998 | Sheu et al. .................. 428/403 |
| 5,897,953 | A | * | 4/1999 | Ogawa et al. .............. 428/407 |
| 5,904,663 | A | * | 5/1999 | Braverman et al. ........ 604/5.01 |
| 5,922,161 | A | * | 7/1999 | Wu et al. .................. 156/272.6 |
| 5,935,845 | A | * | 8/1999 | Koontz .................... 435/283.1 |
| 5,945,457 | A | * | 8/1999 | Plate et al. ............... 514/772.1 |
| 6,087,300 | A | * | 7/2000 | Davankov et al. .......... 502/402 |
| 6,103,126 | A | * | 8/2000 | Boos et al. ................. 210/645 |
| 6,114,466 | A | * | 9/2000 | Davankov et al. ....... 525/332.2 |
| 6,127,311 | A | * | 10/2000 | Davankov et al. .......... 502/402 |
| 6,133,393 | A | * | 10/2000 | Davankov et al. ....... 526/318.4 |
| 6,136,424 | A | * | 10/2000 | Davankov et al. ....... 428/305.5 |
| 6,153,707 | A | * | 11/2000 | Davankov et al. ....... 525/333.2 |
| 6,156,851 | A | * | 12/2000 | Davankov et al. ....... 525/332.2 |
| 6,159,377 | A | * | 12/2000 | Davankov et al. .......... 210/690 |
| 6,238,795 | B1 | * | 5/2001 | Strom et al. ................ 428/403 |
| 6,303,702 | B1 | * | 10/2001 | Davankov et al. ....... 525/332.2 |
| 6,325,939 | B2 | * | 12/2001 | Strom et al. ................ 210/645 |
| 6,338,801 | B2 | * | 1/2002 | Strom et al. ................ 210/645 |
| 6,358,557 | B1 | * | 3/2002 | Wang et al. ................ 427/2.24 |
| 6,387,974 | B1 | * | 5/2002 | Deissler et al. ............. 521/150 |
| 6,408,894 | B1 | * | 6/2002 | Davankov .................... 141/12 |
| 6,416,487 | B1 | * | 7/2002 | Braverman et al. ........ 604/5.01 |
| 6,419,830 | B2 | * | 7/2002 | Strom et al. ................ 210/645 |
| 6,423,024 | B1 | * | 7/2002 | Strom et al. ................... 604/8 |
| 6,531,523 | B1 | * | 3/2003 | Davankov et al. .......... 523/201 |
| 6,884,829 | B2 | * | 4/2005 | Albright .................... 523/201 |
| 2002/0037983 | A1 | * | 3/2002 | Murata et al. .............. 526/193 |
| 2002/0042487 | A1 | * | 4/2002 | Deissler et al. ............. 526/336 |
| 2004/0076845 | A1 | * | 4/2004 | Albright .................... 428/515 |

* cited by examiner

*Primary Examiner*—Vivian Chen
(74) *Attorney, Agent, or Firm*—Dan M. De La Rosa

(57) ABSTRACT

A polymer with a hemocompatible film or coating is manufactured by a one-step method comprising polymerizing monomer droplets comprising at least one crosslinking agent to form a polymer and simultaneously coating the resulting polymer using at least one dispersing agent to thereby form a hemocompatible coated polymer.

24 Claims, No Drawings

HEMOCOMPATIBLE COATED POLYMER AND RELATED ONE-STEP METHODS

RELATED APPLICATION

This application is a continuation of U.S. application Ser. No. 10/273,249, entitled "Hemocompatible Coated Polymers And Related One-Step Methods" which was filed on Oct. 18, 2002 now U.S. Pat. No. 6,885,829.

BACKGROUND OF THE INVENTION

1. Field of the Invention

The present invention relates to a polymer with a hemocompatible coating comprising at least one crosslinking agent for making the polymer and at least one dispersing agent whereby the dispersing agent forms a hemocompatible surface coating on the polymer. More specifically, the present invention relates to a hemocompatible coated polymer manufactured by a method comprising simultaneously polymerizing and coating with at least one crosslinking agent for making the polymer and using at least one dispersing agent to form a hemocompatible coated polymer.

2. Description of Related Art

It has been known and practiced in the art of suspension polymerization to manufacture polymers with a hemocompatible coating using a two-step process. In the first step of the two-step process, polymeric beads are manufactured by polymerizing monomer droplets using suspension polymerization. In the second step of the process, a hemocompatibilizing film is applied onto the exterior surface of the polymer to provide the hemocompatible coating. Unlike the prior art, the polymers of the present invention are manufactured using a one step process which utilizes at least one dispersing agent to form a hemocompatible surface coating on the polymer.

SUMMARY OF THE INVENTION

The present invention relates to a polymer with a hemocompatible coating comprising at least one crosslinking agent for making the polymer and at least one dispersing agent whereby the dispersing agent forms a hemocompatible surface on the polymer. In one embodiment, the dispersing agent comprises a biocompatibilizing polymer.

In another embodiment, the biocompatibilizing polymer comprises poly(N-vinylpyrrolidinone). In still another embodiment, the biocompatibilizing polymer is selected from a group consisting of poly(hydroxyethyl methacrylate), poly(hydroxyethyl acrylate), poly(dimethylaminoethyl methacrylate), salts of poly(acrylic acid), salts of poly(methacrylic acid), poly(diethylaminoethyl methacrylate), poly(hydroxypropyl methacrylate), poly(hydroxypropyl acrylate), poly(N-vinylpyrrolidinone), poly(vinyl alcohol) and mixtures thereof. In another embodiment, the salts may be sodium and potassium salts and in still another embodiment, the salts are water-soluble salts.

In yet another embodiment, the dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly(dimethylaminoethyl acrylate), poly(diethylamimoethyl methacrylate), poly(diethylaminoethyl acrylate), poly(vinyl alcohol), salts of poly(methacrylic acid), and salts of poly(acrylic acid) and mixtures thereof.

In still another embodiment, the crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital tetra-, tri-, and dimethacrylates, pentaerythritol tetra-, tri- and diacrylates, dipentaerythritol tetra, tri-, and dimethacrylates, dipentaerythritol tetra-, tri-, and diacrylates, divinylformamide, and mixtures thereof.

In still yet another embodiment, the crosslinking agent comprises divinylbenzene. In a further embodiment, the crosslinking agent comprises trivinylcylohexane. In yet a further embodiment, the crosslinking agent comprises trivinylbenzene.

In still a further embodiment, the crosslinking agent comprises copolymers of divinylbenzene with comonomers being selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide, methyl methacrylate, methyl acrylate and mixtures thereof.

In still yet a further embodiment, the polymer with the hemocompatible surface is a porous polymer. In another further embodiment, the polymer with the hemocompatible surface is an ion exchange polymer. In a further embodiment, the polymer is an affinity polymer. In yet another further embodiment, the biocompatibilizing polymer becomes grafted to the surface of the polymer to provide a polymer with the hemocompatible surface. For purposes of this invention, the term "grafting" is defined as chemically bonded with potential entanglement such that the dispersing agent is physically restricted from leaving the surface of the polymer.

In another embodiment, the present invention relates to a polymer manufactured by a process comprising: simultaneously polymerizing and coating with at least one crosslinking agent for making the polymer and using at least one dispersing agent to form a hemocompatible coated polymer.

For purposes of this invention, the term "hemocompatibility" is defined as a condition whereby a material, when placed in contact with whole blood and blood components or physiological fluids, results in clinically acceptable physiological changes. In another embodiment, the dispersing agent is a biocompatibilizing polymer. A "biocompatibilizing polymer" is defined as a polymer, which forms a surface over a non-biocompatible material, making the polymeric system compatible with physiological fluids and tissues. The term "crossliking agent" is defined as a linking agent such as a polyfunctional monomer that links two or more polymer chains or segments of the same polymer chain together. The term "dispersing agent" is defined as a substance that imparts a stabilizing effect upon a finely divided array of immiscible particles suspended in a fluidizing medium. The immiscible particles can be a solid, liquid or gas and the fluidizing medium can be a liquid or a gas.

In another embodiment, the crosslinking agent is polymerized with at least one vinyl monomer. In a further embodiment, the dispersing agent forms a hemocompatible coating on a surface of the polymer. In yet a further embodiment, the coating of the polymer is equivalent to the surface of the polymer.

In another embodiment, the dispersing agent comprises a biocompatibilizing polymer. In still another embodiment, the biocompatibilizing polymer is poly(N-vinylpyrrolidinone). In another embodiment, the biocompatibilizing polymer is poly(vinyl alcohol). In yet another embodiment, the biocompatibilizing polymer is selected from a group consisting of poly(hydroxyethyl methacrylate), poly(hydroxyethyl acrylate), poly(dimethylaminoethyl methacrylate), salts of poly(acrylic acid), salts of poly(methacrylic acid), poly(diethylaminoethyl methacrylate), poly(hydroxypropyl methacrylate), poly(hydroxypropyl acrylate), poly(N-vinylpyrrolidinone), poly(vinyl alcohol) and mixtures thereof. For purposes of this invention, any biocompatibilizing polymer that can function as a dispersant can be used in accordance with this invention.

In a further embodiment, the dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly(dimethylaminoethyl acrylate), poly(diethylamimoethyl methacrylate), poly(diethylaminoethyl acrylate), poly(vinyl alcohol), salts of poly (methacrylic acid), and salts of poly(acrylic acid) and mixtures thereof.

In still a further embodiment, the crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital tetra-, tri-, and dimethacrylates, pentaerythritol tetra-, tri- and diacrylates, dipentaerythritol tetra, tri-, and dimethacrylates, dipentaerythritol tetra-, tri-, and diacrylates, divinylformamide and mixtures thereof. In yet a further embodiment, the crosslinking agent comprises divinylbenzene. In still a further embodiment, the crosslinking agent comprises trivinylbenzene. In still another further embodiment, the crosslinking agent comprises divinylnaphthalene. In yet another further embodiment, the crosslinking agent comprises trivinylcylohexane.

In still yet a further embodiment, the crosslinking agent comprises copolymers of divinylbenzene with comonomers selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide and mixtures thereof.

In still a further embodiment, the polymer is processed in non-pyrogenic water. For purposes of this invention, "non-pyrogenic" shall be defined by U.S.P. 25, Monograph (151) Pyrogenic Test, U.S. Pharmacopeia National Formulary.

In still yet another embodiment, the polymer of the present invention is prepared by suspension polymerization. For purposes of the invention, suspension polymerization is defined as the polymerization of monomer droplets dispersed in an immiscible liquid. Based upon an Elemental Analysis of the Polymer's Surface by X-Ray Photoelectron Spectroscopy (XPS), the dispersing agent becomes chemically grafting onto the surface of the polymer as the monomer droplets are transformed into polymeric beads. Polymers coated with poly(N-vinylpyrrolidinone) have been found to be biocompatible and hemocompatible. The hemocompatible polymers of the present invention pass the Lee White clotting tests and the tests for the hemolysis of red blood cells.

In another embodiment, the polymer of the present invention is a porous polymer. The term "porous polymer" is defined as a polymer particle having an internal pore structure with a porosity resulting from voids or holes throughout the polymer matrix. In still another embodiment, the polymer is an ion exchange resin or polymer. An ion exchange resin or polymer is a resin or polymer carrying ionogenic groups that are capable of exchanging ions or of sequestering ions. The ion exchange polymers of the present invention are beneficial when used with blood for removing and isolating varying ions and ionogenic molecules.

In still yet another embodiment, the present invention relates to a polymer with a hemocompatibilizing surface coating. In a further embodiment, the coated polymer is manufactured by a one step process comprising: simultaneously coating and polymerizing monomer droplets in a suspension polymerization procedure with at least one dispersing agent having encapsulated the droplets with a hemocompatible coating to thereby form a polymer with a hemocompatible surface-coating grafted onto the surface of the polymer beads.

In another further embodiment, the dispersing agent comprises a biocompatibilizing polymer. In still a further embodiment, the biocompatibilizing polymer is poly(N-vinylpyrrolidinone). In yet a further embodiment, the biocompatibilizing polymer is selected from a group consisting of poly(hydroxyethyl methacrylate), poly(hydroxyethyl acrylate), poly(dimethylaminoethyl methacrylate), salts of poly(acrylic acid), salts of poly(methacrylic acid), poly (diethylaminoethyl methacrylate), poly(hydroxypropyl methacrylate), poly(hydroxypropyl acrylate), poly(N-vinylpyrrolidinone), poly(vinyl alcohol) and mixtures thereof In still yet a further embodiment, the polymer geometry comprises beads, spheroids, pellets, granules and mixtures thereof.

In a further embodiment, the monomer droplets are selected from a group consisting of divinylbenzene, styrene, ethylstyrene, acrylonitrile, butyl acrylate, butyl methacrylate, vinyltoluene, vinylnaphthalene, octyl methacrylate, octyl acrylate, cetyl methacrylate, cetyl acrylate, ethyl methacrylate, ethyl acrylate, vinylbenzyl alcohol, vinylformamide and mixtures thereof.

In another embodiment, the present invention relates to a method of manufacturing a biocompatible and hemocompatible surface coated polymer. In still another embodiment, the method comprises: polymerizing monomer droplets comprising at least one crosslinking agent and simultaneously coating the resulting polymer beads using at least one dispersing agent to form a biocompatible surface coated polymer. In still another embodiment, the coated polymers are hemocompatible. In yet another embodiment, the polymer is formed using a suspension polymerization procedure. In another embodiment, the polymer is formed using an emulsion polymerization procedure followed by growing the particles with additional monomer feed.

In still another embodiment, the present invention relates to an application of use whereby the hemocompatible surface coated polymers of the present invention are utilized for medical applications. In another embodiment, the hemocompatible polymers of the present invention may be used to isolate and/or remove target substances from blood and physiological fluids and for specific treatments. In a further embodiment, the hemocompatible polymers of the present invention may be used in preserving organs. In yet another embodiment, the present invention relates to an apparatus for isolating blood components and for purifying blood using the hemocompatible surface coated polymers of the present invention. In one embodiment, the apparatus comprises a cartridge containing the hemocompatible polymers of the present invention.

In yet a further embodiment, the present invention relates to a polymer with a hemocompatible surface coating, the polymer being manufactured by a method comprising: polymerizing monomer droplets comprising at least one crosslinking agent to form a polymer and developing a surface coating on the polymer by using at least one dispersing agent carrying hydroxyl groups followed by a reaction of hydroxyl groups with a vinyl monomer or polymer to thereby form the hemocompatible surface coating on the polymer.

In still yet a further embodiment, the present invention also relates to a method of manufacturing a hemocompatible surface coated polymer using a one step process, the method comprising: polymerizing monomer droplets comprising at least one crosslinking agent to form a polymer and developing a surface coating on the polymer by using at least one dispersing agent carrying hydroxyl groups followed by a reaction of hydroxyl groups with a vinyl monomer or polymer to thereby form the hemocompatible surface coating on the polymer.

In another embodiment, the present invention relates to a polymer having a hemocompatible-coated surface, the polymer being manufactured by a two-step process comprising: polymerizing monomer droplets comprising at least one crossliking agent and at least one dispersing agent to form a polymer; and coating the surface of the polymer by crosslinking a monovinyl monomer and a polyfunctional monomer mixture over the surface of the polymer bead to thereby form the hemocompatible coating on the surface of the polymer.

In a further embodiment, the present invention relates to a method comprising: polymerizing monomer droplets comprising at least one crosslinking agent and at least one dispersing agent to form a polymer; and coating the surface of the polymer by crosslinking a monovinyl monomer and a polyfunctional monomer mixture over the surface of the polymer bead to thereby form the hemocompatible coating on the surface of the polymer.

In another embodiment, the present invention relates to a hemocompatible system comprising an organic phase and an aqueous phase, wherein the organic phase composed of the polymerizable monomers and the porogen are dispersed into a slurry of droplets by agitation throughout the aqueous phase which is formulated to effect the stability of the droplets by the water-miscible dispersant and to quench polymer growth in the aqueous phase by carrying a water-soluble free radical inhibitor.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The specific example below will enable the invention to be better understood. However, they are given merely by way of guidance and do not imply any limitation.

EXAMPLE 1

The first polymer synthesis was targeted at an aqueous to organic volume ratio of 1.0. Table 1 below illustrates the targeted dispersion mixture designed for Example 1 using a fifty (50) liter reaction.

TABLE 1

| Dispersion Mixture Desires for 50 Liters | |
|---|---|
| Aqueous/Organic Volume Ratio | 1.0 |
| Volume of Organic Phase, ml | 25,000.0 |
| Volume of Aqueous Phase, ml | 25,000.0 |
| Density of Organic Phase, g/ml | 0.83490 |
| Weight of Organic Phase, g | 20,872.5 |
| Density of Aqueous Phase, g/ml | 1.005 |
| Weight of Aqueous Phase, g | 25,125.0 |
| Polymerizable Monomers, DVB plus EVB, g | 8766.45 |
| Total Volume of Organic & Aqueous Phases, ml | 50,000.0 |
| Total Weight of Organic & Aqueous Phases, g | 45,997.5 |

The procedure for the polymerization in Example 1 is initiated by the preparation of an aqueous phase and an organic phase. Table 2 and 3 below illustrate the components of the aqueous phase composition for the polymer synthesis by weight percent (%) and by quantity of the components in grams (g), respectively.

TABLE 2

| Aqueous Phase Composition | |
|---|---|
| Ultrapure Water, wt. % | 98.089 |
| Water from Aqueous 45% Solution of Poly(N-vinylpyrrolidinone), wt. % | 0.611 |
| Poly(N-vinylpyrrolidinone) Pure, wt. % | 0.500 |
| Sodium Carbonate, wt. % | 0.500 |
| Sodium Nitrite, wt. % | 0.300 |

Other dispersants, such as poly(vinyl alcohol) have been used as a substitute for the poly(N-vinylpyrrolidinone).

TABLE 3

| Aqueous Phase Charges | |
|---|---|
| Ultrapure Water, g | 24,644.83 |
| Water from Aqueous 45% Solution of Poly(N-vinylpyrrolidinone), g | (153.542) |
| Poly(N-vinylpyrrolidinone) Pure, g | (125.625) |
| Aqueous Poly(N-vinylpyrrolidinone) Solution, 45 wt. %, g | 279.167 |
| Sodium Carbonate, g | 125.625 |
| Sodium Nitrite, g | 75.375 |
| Weights in parenthesis are part of other charged materials | |
| Total Weight of Aqueous Phase, g | 25,124.997 |

Table 4 and 5 illustrate the components of the organic phase composition for the polymer synthesis by weight percent (5) and by quantity of the components in grams (g), respectively.

TABLE 4

| Organic Phase Composition | |
|---|---|
| Divinylbenzene (DVB), wt. % | 26.998 |
| Ethylvinylbenzene (EVB), wt. % | 15.0024 |
| Inerts, wt. % | 0.41567 |
| Toluene, wt. % | 27.134 |
| Isooctane, wt. % | 30.450 |
| Benzoyl Peroxide, wt. % of polymerizable monomers | 1.03 |

Other immiscible porogens such as isooctane, cyclohexane and nonane have been substituted, both singularly and in combination with one another, for the mixture of toluene and isooctane.

TABLE 5

Organic Phase Charges

| | |
|---|---|
| Divinylbenzene, Pure, g | (5635.069) |
| Ethylvinylbenzene, Pure, g | (3131.381) |
| Commercial DVB, Dow 63.5%, g | 8853.211 |
| Inerts, g | (86.761) |
| Toluene, g | 5663.613 |
| Isooctane, g | 6355.676 |
| Weights in parenthesis are part of commercial DVB | |
| Total Weight of Organic Phase, g (excluding BPO) | 20,872.50 |
| Benzoyl Peroxide, BPO, Pure, g | 90.294 |
| 75 weight percent BPO, g | 120.393 |
| 97 weight oercent BPO, g | 93.087 |

Upon preparation of the aqueous and organic phases, the aqueous phase is introduced into the reactor. The reactor is set at an agitation rate of approximately 86 revolutions per minute. The aqueous phase is then heated to 65 degrees Celsius with agitation and a nitrogen sweep through the headspace in order to displace oxygen from the reactor space. The organic phase is then introduced into the reactor by pouring or pumping the organic phase onto the aqueous phase under agitation at a stirring rate of at least 86 revolutions per minute. The droplet dispersion is then stirred at 86 revolutions per minute for at least fifteen (15) minutes to set the droplet size and allow the droplet slurry to equilibrate as the temperature is raised from about 65 degrees to about 70 degrees Celsius. Once the droplet dispersion is homogenous throughout the reaction volume, the slurry is then heated to about 75 plus or minus 2.0 degrees Celsius and held at that temperature for ten (10) hours.

The slurry is cooled to about 70 degrees Celsius and the stirrer is turned off, and the polymer beads are allowed to collect at the top of the fluid bed. The mother liquor is then removed from the bottom of the reactor via a pump until the bead bed approaches within about one (1) inch from the bottom of the reactor. The mother liquor is discarded.

A sufficient amount of ultrapure water at ambient temperature is added to fluidize the bead bed. The quality of water needed to wash the beads will be approximately one (1) bed volume or about 25 liters of water. Upon adding the water, the stirrer is then restarted and agitated at a stir rate of 106 revolutions per minute for about five (5) minutes. The stirring is stopped and the beads are allowed to collect at the top of the fluid bed.

The liquor is then drained from the bottom of the reactor via a pump until the bead bed approaches within about one (1) inch from the bottom of the reactor. The wash liquor is discarded. The beads are then washed with the ultrapure water for at least five (5) washes or until the bulk fluid is transparent and free of junk polymer (a clear liquor is achieved). The water-wet bead slurry is transferred to a column that is fitted with a solid-liquid separator at the bottom of the column. The separator may be a mesh or screen made from Teflon, nylon, polypropylene, stainless steel, or glass with pore openings in the size from about 100 to about 300 microns.

The porogen mixture is displaced from the beads by a downflow treatment with ten (10) bed volumes of isopropyl alcohol at a flow rate of one (1) bed volume per hour. The isopropyl alcohol is displaced from the beads with water at a downflow treatment with ten (10) bed volumes of ultrapure water (pyrogen and endotoxin free) at a flow rate of one (1) bed volume per hour. The polymer beads are then transferred from the column into plastic containers for transport to the thermal steam-flux cleaner.

EXAMPLE 2

Experiments were performed using the polymer beads manufactured by the polymerization procedures described in Example 1 and the measured results on the polymer products are illustrated in Tables 6–7 set forth below:

TABLE 6

Experimental Program: Input

| LDM | Sample ID 02-001 | Sample ID 02-004 | Sample ID 02-006 | Sample ID 02-008 | Sample ID 02-010 | Sample ID 02-012 | Sample ID 02-015 | Sample ID 02-016 | Sample ID 02-017 | Sample ID 02-022 | Sample ID 02-025 |
|---|---|---|---|---|---|---|---|---|---|---|---|
| Organic phase Composition | | | | | | | | | | | |
| Monomer (DVB &EVB) Wt. % | 42.0 | 42.0 | 42.0 | 42.0 | 40.7 | 50.0 | 40.0 | 40.0 | 45.0 | 45.0 | 45.0 |
| Porogen Wt. % | 58.0 | 58.0 | 58.0 | 58.0 | 59.3 | 50.0 | 60.0 | 60.0 | 55.0 | 55.0 | 55.0 |
| Porogen/Monomer Ratio | 1.3810 | 1.3810 | 1.3810 | 1.3810 | 1.457 | 1.000 | 1.500 | 1.500 | 1.222 | 1.222 | 1.222 |
| Benzoyl Peroxide (BPO) Wt. % | 1.03 | 1.03 | 1.03 | 1.03 | 1.03 | 1.03 | 1.03 | 1.03 | 1.03 | 1.03 | 1.03 |
| Porogen Composition | | | | | | | | | | | |
| Isooctane, Wt. % | 52.5 | 52.5 | 52.5 | 52.5 | 53.5 | 60.0 | 99.327 | 99.327 | 99.174 | 99.174 | 99.174 |
| Toluene, Wt. % | 46.769 | 46.769 | 46.769 | 46.769 | 45.81 | 38.99 | 0 | 0 | 0 | 0 | 0 |
| Inerts, Wt. % | 0.731 | 0.731 | 0.731 | 0.731 | 0.693 | 1.010 | 0.6734 | 0.826 | 0.826 | 0.826 | 0.726 |
| Toluene plus Inerts, Wt. % | 47.5 | 47.5 | 47.5 | 47.5 | 46.5 | 40.0 | — | — | — | — | — |
| Isooctane/Toluene plus Inerts Ratio | 1.105 | 1.105 | 1.105 | 1.105 | 1.1505 | 1.500 | — | — | — | — | — |
| Aquoeus phase Composition | | | | | | | | | | | |
| Sodium Carbonate, Wt. % | 0.500 | 0.500 | 0.500 | 0.500 | 0.500 | 0.500 | 0.500 | 0.500 | 0.500 | 0.500 | 0.500 |
| Sodium Nitrate, Wt. % | 0.300 | 0.300 | 0.300 | 0.300 | 0.300 | 0.300 | 0.300 | 0.300 | 0.300 | 0.300 | 0.300 |
| Poly(N-Vinylpyrrolidione) Wt. % | 0.500 | 0.500 | 0.450 | 0.400 | 0.400 | 0.400 | 0.100 | 0.400 | 0.500 | 0.500 | 1.000 |
| PVP K 30, 45–55 Kdaltons, Wt. % | 0 | 0 | 0 | 0 | 0 | 0 | 0 | 0 | 0 | 0.250 | 1.000 |

TABLE 6-continued

Experimental Program: Input

| | | | | | | | | | | | |
|---|---|---|---|---|---|---|---|---|---|---|---|
| PVP K 60,400–500 Kdaltons, Wt. % | 0.500 | 0.500 | 0.450 | 0.400 | 0.400 | 0.400 | 0.100 | 0.400 | 0.500 | 0.250 | 0 |
| Poly(Vinyl alcohol), Wt. % | 0.01 | 0.01 | 0.05 | 0.100 | 0.100 | 0.100 | 0.400 | 0.100 | 0 | 0 | 0 |
| Molecular Size, Kdaltons | 88.0 | 88.0 | 95.0 | 95.0 | 95.0 | 95.0 | 95.0 | 95.0 | — | — | — |
| Amount Hydrolyzed, % | 85 | 85 | 95 | 95 | 95 | 95 | 95 | 95 | — | — | — |
| Aqueous/Organic Phase Volume Ratio | 0.9 | 0.9 | 0.9 | 0.9 | 0.9 | 0.9 | 0.9 | 0.9 | 0.9 | 1.1 | 1.1 |

| LDM | Sample ID 02-028 | Sample ID 02-029 | Sample ID 02-030 | Sample ID 02-031 | Sample ID 02-032 | Sample ID 02-033 | Sample ID 02-034 | Sample ID 02-036 | Sample ID 02-038 | Sample ID 02-040 | Sample ID 02-042 | Sample ID 02-044 |
|---|---|---|---|---|---|---|---|---|---|---|---|---|
| Organic Phase Composition | | | | | | | | | | | | |
| Monomer (DVB & EVB) Wt. % | 45.0 | 45.0 | 45.0 | 45.0 | 45.0 | 50.0 | 55.0 | 55.0 | 55.0 | 55.0 | 55.0 | 55.0 |
| Porogen Wt. % | 55.0 | 55.0 | 55.0 | 55.0 | 55.0 | 50.0 | 45.0 | 45.0 | 45.0 | 45.0 | 45.0 | 45.0 |
| Porogen/Monomer Ratio | 1.222 | 1.222 | 1.222 | 1.222 | 1.222 | 1.000 | 0.8182 | 0.8182 | 0.8182 | 0.8182 | 0.8182 | 0.8182 |
| Benzoyl Peroxide (BPO) Wt. % | 1.03 | 1.03 | 1.03 | 1.03 | 1.03 | 1.03 | 1.03 | 1.03 | 1.03 | 1.03 | 1.03 | 1.03 |
| Porogen Compostion | | | | | | | | | | | | |
| Isooctane, Wt. % | 99.274 | 99.274 | 99.274 | 99.274 | 99.274 | 99.1122 | 98.915 | 98.915 | 98.915 | 98.915 | 98.915 | 98.915 |
| Toluene, Wt. % | 0 | 0 | 0 | 0 | 0 | 0 | 0 | 0 | 0 | 0 | 0 | 0 |
| Inerts, Wt. % | 0.726 | 0.726 | 0.726 | 0.726 | 0.726 | 0.8878 | 1.085 | 1.085 | 1.085 | 1.085 | 1.085 | 1.085 |
| Toluene plus Inerts, Wt. % | — | — | — | — | — | — | — | — | — | — | — | — |
| Isooctane/Toluene plus Inerts Ratio | — | — | — | — | — | — | — | — | — | — | — | — |
| Aqueous Phase Composition | | | | | | | | | | | | |
| Sodium Carbonate, Wt. % | 0.500 | 0.500 | 0.500 | 0.500 | 0.500 | 0.500 | 0.500 | 0.500 | 0.500 | 0.500 | 0.500 | 0.500 |
| Sodium Nitrate, Wt. % | 0.300 | 0.300 | 0.300 | 0.300 | 0.300 | 0.300 | 0.300 | 0.300 | 0.300 | 0.300 | 0.300 | 0.300 |
| Poly(N-Vinylpyrrolidione) Wt. % | 0.700 | 0.900 | 1.000 | 1.000 | 1.500 | 1.000 | 0.500 | 1.300 | 1.100 | 1.000 | 0.200 | 0.300 |
| PVP K 30, 45–55 Kdaltons, Wt. % | 0.700 | 0.900 | 1.000 | 1.000 | 1.500 | 0.900 | 0 | 1.000 | 1.000 | 0.800 | 0 | 0 |
| PVP K 60, 400–500 Kdaltons, Wt. % | 0 | 0 | 0 | 0 | 0 | 0.100 | 0.500 | 0.300 | 0.100 | 0.200 | 0.200 | 0.300 |
| Poly(Vinyl alcohol), Wt. % | 0 | 0 | 0 | 0 | 0 | 0 | 0 | 0 | 0 | 0 | 0 | 0 |
| Molecular Size, Kdaltons | — | — | — | — | — | — | — | — | — | — | — | — |
| Amount Hydrolysed, % | — | — | — | — | — | — | — | — | — | — | — | — |
| Aqueous/Organic Phase Volume Ratio | 1.2 | 1.2 | 1.145 | 1.2 | 1.2 | 1.1 | 1.1 | 1.0 | 1.0 | 1.0 | 1.0 | 1.0 |

| LDM | Sample ID 02-047 | Sample ID 02-049 | Sample ID 02-050 | Sample ID 02-052 | Sample ID 02-054 | Sample ID 02-055 | Sample ID 02-059 | Sample ID 02-061 | Sample ID 02-073 | Sample ID 02-074 | Sample ID 02-075 | Sample ID 02-079 |
|---|---|---|---|---|---|---|---|---|---|---|---|---|
| Organic Phase Composition | | | | | | | | | | | | |
| Monomer (DVB & EVB) Wt. % | 55.0 | 55.0 | 55.0 | 55.0 | 55.0 | 55.0 | 55.0 | 55.0 | 55.0 | 55.0 | 55.0 | 55.0 |
| Porogen Wt. % | 45.0 | 45.0 | 45.0 | 45.0 | 45.0 | 45.0 | 45.0 | 45.0 | 45.0 | 45.0 | 45.0 | 45.0 |
| Porogen/Monomer Ratio | 0.8182 | 0.8182 | 0.8182 | 0.8182 | 0.8182 | 0.8182 | 0.8182 | 0.8182 | 0.8182 | 0.8182 | 0.8182 | 0.8182 |
| Benzoyl Peroxide (BPO) Wt. % | 1.03 | 1.03 | 1.03 | 1.03 | 1.03 | 1.03 | 1.03 | 1.03 | 1.03 | 1.03 | 1.03 | 1.03 |
| Porogen Composition | | | | | | | | | | | | |
| Isooctane, Wt. % | 98.915 | 98.915 | 98.915 | 98.915 | 98.915 | 98.915 | 98.915 | 98.915 | 98.915 | 98.915 | 98.915 | 98.915 |
| Toluene, Wt. % | 0 | 0 | 0 | 0 | 0 | 0 | 0 | 0 | 0 | 0 | 0 | 0 |
| Inerts, Wt. % | 1.085 | 1.085 | 1.085 | 1.085 | 1.085 | 1.085 | 1.085 | 1.085 | 1.085 | 1.085 | 1.085 | 1.085 |
| Toluene plus Inerts, Wt. % | — | — | — | — | — | — | — | — | — | — | — | — |
| Isooctane/Toluene plus Inerts Ratio | — | — | — | — | — | — | — | — | — | — | — | — |
| Aqueous Phase Composition | | | | | | | | | | | | |
| Sodium Carbonate, Wt. % | 0.300 | 0.100 | 0.500 | 0.500 | 0.500 | 0.500 | 0.500 | 0.500 | 0.500 | 0.500 | 0.500 | 0.500 |
| Sodium Nitrate, Wt. % | 0.300 | 0.100 | 0.300 | 0.300 | 0.300 | 0.300 | 0.300 | 0.300 | 0.300 | 0.300 | 0.300 | 0.300 |
| Poly(N-Vinylpyrrolidione) Wt. % | 0.010 | 0.010 | 0 | 0.05 | 0 | 0 | 0 | 0 | 0 | 0 | 0 | 0 |
| PVP K 30, 45–55 Kdaltons, Wt. % | 0.010 | 0.010 | 0 | 0.05 | 0 | 0 | 0 | 0 | 0 | 0 | 0 | 0 |
| PVP K 60, 400–500 Kdaltons, Wt. % | 0 | 0 | 0 | 0 | 0 | 0 | 0 | 0 | 0 | 0 | 0 | 0 |
| Poly(Vinyl alcohol), Wt. % | 0.250 | 0.400 | 0 | 0 | 0 | 0 | 0.300 | 0.300 | 0.300 | 0.300 | 0.300 | 0.300 |
| Molecular Size, Kdaltons | 95 | 95 | — | — | — | — | 170 | 170 | 170 | 170 | 170 | 170 |
| Amount Hydrolyzed, % | 95 | 95 | — | — | — | — | 88 | 88 | 88 | 88 | 88 | 88 |

TABLE 6-continued

| Experimental Program: Input | | | | | | | | | | | | | |
|---|---|---|---|---|---|---|---|---|---|---|---|---|---|
| Natrosol Plus, Wt. % | 0 | 0 | 0.500 | 0.300 | 0.300 | 0.300 | 0 | 0 | 0 | 0 | 0.05 | 0 |
| Aqueous/Organic Phase Volume Ratio | 1.0 | 1.0 | 1.0 | 1.0 | 1.0 | 1.0 | 1.0 | 1.0 | 1.0 | 1.0 | 1.0 | 1.0 |

| LDM | Sample ID 02-082 | Sample ID 02-083 | Sample ID 02-086 | Sample ID | Sample ID | Sample ID | Sample ID | Sample ID | Sample ID | Sample ID | Sample ID | Sample ID |
|---|---|---|---|---|---|---|---|---|---|---|---|---|
| Organic Phase Composition | | | | | | | | | | | | |
| Monomer (DVB &EVB) Wt. % | 55.0 | 55.0 | 55.0 | | | | | | | | | |
| Porogen Wt. % | 45.0 | 45.0 | 45.0 | | | | | | | | | |
| Porogen/Monomer Ratio | 0.8182 | 0.8182 | 0.8182 | | | | | | | | | |
| Benzoyl Peroxide (BPO) Wt. % | 1.03 | 1.03 | 1.03 | | | | | | | | | |
| Porogen Composition | | | | | | | | | | | | |
| Isooctane, Wt. % | 98.915 | 98.915 | 98.915 | | | | | | | | | |
| Toluene, Wt. % | 0 | 0 | 0 | | | | | | | | | |
| Inerts, Wt. % | 1.085 | 1.085 | 1.085 | | | | | | | | | |
| Toluene plus Inerts, Wt. % | — | — | — | | | | | | | | | |
| Isooctane/Toluene plus Inerts Ratio | — | — | — | | | | | | | | | |
| Aqueous Phase Composition | | | | | | | | | | | | |
| Sodium Carbonate, Wt. % | 0.500 | 0.500 | 0.500 | | | | | | | | | |
| Sodium Nitrate, Wt. % | 0.300 | 0.300 | 0.300 | | | | | | | | | |
| Poly(N-Vinylpyrrolidione) Wt. % | 0 | 0 | 0 | | | | | | | | | |
| PVP K 30, 45–55 Kdaltons, Wt. % | 0 | 0 | 0 | | | | | | | | | |
| PVP K 60, 400–500 Kdaltons, Wt. % | 0 | 0 | 0 | | | | | | | | | |
| Poly(Vinyl alcohol), Wt. % | 0.300 | 0.300 | 0.300 | | | | | | | | | |
| Molecular Size, Kdaltons | 170 | 100 | 170 | | | | | | | | | |
| Amount Hydrolyzed, % | 88 | 85 | 88 | | | | | | | | | |
| Natrosol Plus, Wt. % | 0 | 0 | 0 | | | | | | | | | |
| Aqueous/Organic Phase Volume Ratio | 1.0 | 1.0 | 1.0 | | | | | | | | | |

TABLE 7

| Experimental Programs: Responses | | | | | |
|---|---|---|---|---|---|
| | Sample ID LDM-02-001 | Sample ID LDM-02-004 | Sample ID LDM-02-006 | Sample ID LDM-02-008 | Sample ID LDM-02-010 |
| Surface Characteristics | | | | | |
| SEM; description (smooth, nodes present, open or closed pore structure) | nodes, closed | nodes, closed | nodes, closed | nodes, closed | nodes, closed |
| Internal Pore Structure | | | | | |
| BET Surface Area, S | 563.5001 | 652.7807 | 615.7039 | 614.4325 | 661.4491 |
| Porosity, Pwt in ml · g -1 | 0.921032 | 1.536987 | 1.530853 | 1.724477 | 1.772158 |
| Pore modes greater than 100 A Diameter from desorption Isotherm. List each | 150 | 250, 400 | 200, 600 | 450, 550 | 500 |
| Pore modes range in A greater than 100 A diameter, desorption Isotherm. | 100–250 | 100–500 | 100–700 | 100–700 | 100–600 |
| Particle Size Distribution | | | | | |
| Unclassified, directly from reactor | | | | | |
| Cytonchrome C Sorption | | | | | |
| Static Assessment 500 mg/Liter Conc. | | | | | |
| Mg cyto c sorbed/g dry polymer at 3 hr contact | 15.2 | 43.35 | 42.95 | 63.05 | 79.7 |
| % of cyto C removed from solution at 3 hr contact | 19.23 | 53.8 | 51.46 | 66.22 | 73.78 |

TABLE 7-continued

Serum Albumin Sorption

% removed from solution with a concentration of 35,000 mg/l of serum albumin
Mg BSA(or HSA) sorbed/g dry polymer at 3 hr contact
Coating Assessment
ESCA Measurements for Surface Components
Atom Fraction on surface

|   |   |   |   |   |   |
|---|---|---|---|---|---|
| C | 0.8702 | 0.8722 | 0.8917 | 0.8881 | 0.8855 |
| O | 0.0784 | 0.0758 | 0.0682 | 0.0729 | 0.086 |
| N | 0.0514 | 0.052 | 0.0401 | 0.039 | 0.0284 |

|   | Sample ID LDM-02-017 | Sample ID LDM-02-025 | Sample ID LDM-02-034 | Sample ID LDM-02-036 | Sample ID LDM-02-038 |
|---|---|---|---|---|---|
| Surface Characteristics |   |   |   |   |   |
| SEM; description (smooth, nodes present, open or closed pore structure) | no nodes, open | no nodes, open | no nodes, open | no nodes, open | nodes closed |
| Internal Pore Structure |   |   |   |   |   |
| BET Surface Area, S | 519.8904 | 539.9826 | 537.1961 | 556.5873 | 556.5738 |
| Porosity, Pwt in ml · g -1 | 1.240885 | 1.389936 | 1.906947 | 1.958844 | 1.875443 |
| Pore modes greater than 100 A Diameter from desorption Isotherm. List each | 250, 310, 430, 550, 750 1200, 1800 | 320, 450 550, 750, 1200, 1700 | 380, 490 750, 950 | 210, 280 380, 500, 650 | 210, 280, 380 500, 650, 910 1600 |
| Pore modes range in A greater than 100 A diameter, desorption Isotherm. | 100–1900 | 100–1800 | 100–1600 | 100–1600 | 100–1600 |
| Particle Size Distribution |   |   |   |   |   |
| Unclassified, directly from reactor |   |   |   |   |   |
| Cytonchrome C Sorption |   |   |   |   |   |
| Static Assessment 500 mg/Liter Conc. |   |   |   |   |   |
| Mg cyto c sorbed/g dry polymer at 3 hr contact | 135.9 | 155.8 | 86.6 | 82.0 | 72.4 |
| % of cyto C removed from solution at 3 hr contact | 82.64 | 82.49 | 85.12 | 85.26 | 68.78 |
| Serum Albumin Sorption |   |   |   |   |   |
| % removed from solution with a concentration of 35,000 mg/l of serum albumin | 6.0 |   | 4.1 |   | 5.1 |
| Mg BSA(or HSA) sorbed/g dry polymer at 3 hr contact | 1681.7 |   | 313.9 |   | 328.1 |
| Coating Assessment |   |   |   |   |   |
| ESCA Measurements for Surface Components |   |   |   |   |   |
| Atom Fraction on surface |   |   |   |   |   |
| C | 0.6476 | 0.6134 | 0.8981 | 0.8682 | 0.8901 |
| O | 0.0795 | 0.1178 | 0.0778 | 0.935 | 0.0771 |
| N | 0.0281 | none detected | 0.0241 | 0.0383 | 0.0328 |

|   | Sample ID LDM-02-040 | Sample ID LDM-02-044 | Sample ID LDM-02-054 | Sample ID LDM-02-055A | Sample ID LDM-02-075 |
|---|---|---|---|---|---|
| Cytonchrome C Sorption |   |   |   |   |   |
| Static Assessment 500 mg/Liter Conc. |   |   |   |   |   |
| Mg cyto c sorbed/g dry polymer at 3 hr contact | 57.6 | 61.7 | 73.9 | 57.8 |   |
| % of cyto C removed from solution at 3 hr contact | 61.4 | 65.5 | 79.8 | 63.6 |   |
| Serum Albumin Sorption |   |   |   |   |   |
| % removed from solution with a concentration of 35,000 mg/l of serum albumin | 3.1 |   |   |   |   |

TABLE 7-continued

| | | | | | |
|---|---|---|---|---|---|
| Mg BSA(or HSA) sorbed/g dry polymer at 3 hr contact | 203.1 | | | | |
| Coating Assessment | | | | | |
| ESCA Measurements of Surface Components | | | | | |
| Atom Fraction on surface | | | | | |
| C | 0.8586 | 0.8748 | 0.8238 | 0.7924 | |
| O | 0.0982 | 0.0897 | 0.1745 | 0.2076 | |
| N | 0.0432 | 0.0355 | none detected | none detected | |
| Surface Characteristics | | | | | |
| SEM; description (smooth, nodes present, open or closed pore structure) | nodes, closed | nodes, closed | | nodes, closed | |
| Internal Pore Structure | | | | | |
| BET Surface Area, S | 549.64 | 545.38 | 536.79 | 525.15 | 531.47 |
| Porosity, Pwt in ml · g -1 | 1.8356 | 1.642 | 1.6567 | 1.6957 | 1.5232 |
| Pore modes greater than 100 A Diameter from desorption Isotherm. List each | 300; 400; 500; 650; 850 | 250; 310; 450; 620; 800; 1200 | 200; 300; 400; 500; 650; 920 | 300; 400; 600; 750; 900 | 200; 300; 420; 550; 750; 900; 1200 |
| Pore modes range in A greater than 100 A diameter, desorption Isotherm. | 300–980 | 200–1300 | 200–1700 | 150–1300 | 100–1300 |
| Particle Size Distribution | | | | | |
| Unclassified, directly from reactor | | | | | |

| | Sample ID LDM-02-079 | Sample ID LDM-02-082 | Sample ID LDM-02-083 | Sample ID LDM-02-086 | Sample ID |
|---|---|---|---|---|---|
| Cytonchrome C Sorption | | | | | |
| Static Assessment 500 mg/Liter Conc. | | | | | |
| Mg cyto c sorbed/g dry polymer at 3 hr contact | | 61.1 | | | |
| % of cyto C removed from solution at 3 hr contact | | 74.9 | | | |
| Serum Albumin Sorption | | | | | |
| % removed from solution with a concentration of 35,000 mg/l of serum albumin | | | | | |
| Mg BSA(or HSA) sorbed/g dry polymer at 3 hr contact | | | | | |
| Coating Assessment | | | | | |
| ESCA Measurements of Surface Components | | | | | |
| Atom Fraction on surface | | | | | |
| C | | | | | |
| O | | | | | |
| N | | | | | |
| Surface Characteristics | | | | | |
| SEM; description (smooth, nodes present, open or closed pore structure) | | | | | |
| Internal Pore Structure | | | | | |
| BET Surface Area, S | | 528.93 | | | |
| Porosity, Pwt in ml · g -1 | | 1.3708 | | | |
| Pore modes greater than 100 A Diameter from desorption Isotherm. List each | | 250; 300; 400; 500; 600; 750; 900; 1300 | | | |
| Pore modes range in A greater than 100 A diameter, desorption Isotherm. | | 100–1400 | | | |
| Particle Size Distribution | | | | | |
| Unclassified, directly from reactor | | | | | |

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A hemocompatible-coated polymer comprising at least one crosslinking agent and at least one dispersing agent whereby said dispersing agent forms a hemocompatible surface on said polymer, said dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly(dimethylaminoethyl acrylate), poly(diethylamimoethyl methacrylate), poly(diethylaminoethyl acrylate), poly(vinyl alcohol), poly(N-vinylpyrrolidinone), salts of poly(methacrylic acid), and salts of poly(acrylic acid) and mixtures thereof, said crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital dimethacrylates, pentaerythrital trimethacrylates, pentaerythrital, tetramethacrylates, pentaerythritol diacrylates, pentaerythritol triiacrylates, pentaerythritol tetraacrylates, dipentaerythritol dimethacrylates, dipentaerythritol trimethacrylates, dipentaerythritol tetramethacrylates, dipentaerythritol diacrylates, dipentaerythritol triacrylates, dipentaerythritol tetraacrylates, divinylformamide and mixtures thereof, said polymer being developed simultaneously with the formation of the coating, wherein said dispersing agent gets chemically bound to said surface of said polymer.

2. The polymer of claim 1 claim said dispersing agent comprises a biocompatibilizing polymer.

3. The polymer of claim 2 claim said biocompatibilizing polymer comprises poly(N-vinylpyrrolidinone).

4. The polymer of claim 2 claim said biocompatibilizing polymer becomes grafted to the surface of said polymer to provide said hemocompatible surfaced polymer.

5. The polymer of claim 1 claim said polymer comprises copolymers of divinylbenzene with comonomers being selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide, methyl methacrylate, methyl acrylate and mixtures thereof.

6. The polymer of claim 1 claim said hemocompatible surfaced polymer is a porous polymer.

7. The polymer of claim 1 claim said hemocompatible surfaced polymer is an ion exchange polymer.

8. A biocompatible coated polymer manufactured by a method comprising: polymerizing monomer droplets comprising at least one crosslinking agent to form a polymer and coating said resulting polymer using at least one dispersing agent to thereby form a biocompatible coated polymer, said dispersant being placed on said monomer droplets before polymerization, said dispersing agent is selected from a group consisting of hydroxyethyl cellulose, hydroxypopyl cellulose, poly(hydroxyethyl methacrylate), poly(hydroxyethyl acrylate), poly(hydroxypropyl methacrylate), poly(hydroxypropyl acrylate), poly(dimethylaminoethyl methacrylate), poly(dimethylaminoethyl acrylate), poly (diethylamimoethyl methacrylate), poly-(diethylaminoethyl acrylate), poly(vinyl alcohol), poly(N-vinylpyrrolidinone), salts of poly(methacrylic acid), and salts of poly(acrylic acid) and mixtures thereof, wherein said dispersing agent gets chemically bound to said surface of said polymer.

9. The polymer of claim 8 claim said crosslinking agent is polymerized with at least one vinyl monomer.

10. The polymer of claim 8 claim said dispersing agent forms a hemocompatible coating on the surface of said polymer.

11. The polymer of claim 8 claim said dispersing agent comprises a biocompatibilizing polymer.

12. The polymer of claim 8 wherein said biocompatibilizing polymer is poly (N-vinylpyrrolidinone).

13. The polymer of claim 8 wherein said biocompatibilizing polymer is poly(vinyl alcohol).

14. The polymer of claim 11 wherein said biocompatibilizing polymer becomes grafted to the surface of said polymer to provide said hemocompatible coated polymer.

15. The polymer of claim 8 wherein said crosslinking agent is selected from a group consisting of divinylbenzene, trivinylbenzene, divinylnaphthalene, trivinylcyclohexane, divinylsulfone, trimethylolpropane trimethacrylate, trimethylolpropane dimethacrylate, trimethylolpropane triacrylate, trimethylolpropane diacrylate, pentaerythrital dimethacrylates, pentaerythrital trimethacrylates, pentaerythrital tetramethacrylates, pentaerythritol diacrylates, pentaerythritol triiacrylates, pentaerythritol tetraacrylates, dipentaerythritol dimethacrylates, dipentaerythritol trimethacrylates, dipentaerythritol tetramethacrylates, dipentaerythritol diacrylates, dipentaerythritol triacrylates, dipentaerythritol tetraacrylates, divinylformamide and mixtures thereof.

16. The polymer of claim 8 wherein said crosslinking agent comprises divinylbenzene.

17. The polymer of claim 8 wherein said crosslinking agent comprises trivinylcylohexane.

18. The polymer of claim 8 wherein said crosslinking agent comprises trivinylbenzene.

19. The polymer of claim 8 wherein said polymer comprises copolymers of divinylbenzene with comonomers being selected from a group consisting of styrene, ethylstyrene, acrylonitrile, butyl methacrylate, octyl methacrylate, butyl acrylate, octyl acrylate, cetyl methacrylate, cetyl acrylate, ethyl methacrylate, ethyl acrylate, vinyltoluene, vinylnaphthalene, vinylbenzyl alcohol, vinylformamide and mixtures thereof.

20. The polymer of claim 8 wherein said hemocompatible coated polymer is a porous polymer.

21. The polymer of claim 8 wherein said hemocompatible coated polymer is an ion exchange polymer.

22. The polymer of claim 8 wherein said polymer is processed in non-pyrogenic water.

23. A polymer with a hemocompatible surface coating, said polymer being manufactured by a one step process comprising:

simultaneously coating and polymerizing monomer droplets in a suspension polymerization procedure with at least one dispersing agent having encapsulated said droplets with a hemocompatible coating to thereby form a polymer with a hemocompatible surface-coating grafted onto the surface of said polymer, said dispersing agent being a biocompatibilizing polymer, said dispersing agent is selected from a group consisting of hydroxyethyl cellulose, hydroxypopyl cellulose, poly (hydroxyethyl methacrylate), poly(hydroxyethyl acrylate), poly(hydroxypropyl methacrylate), poly(hydroxypropyl acrylate), poly(dimethylaminoethyl methacrylate), poly-(dimethylaminoethyl acrylate), poly(diethylamimoethyl methacrylate), poly-(diethylaminoethyl acrylate), poly(vinyl alcohol), poly(N-vinylpyrrolidinone), salts of poly(methacrylic acid), and salts of poly(acrylic acid) and mixtures thereof, wherein said dispersing agent gets chemically grafted to said surface of said polymer.

24. The polymer of claim 23 wherein said monomer droplets is selected from a group consisting of divinylbenzene, styrene, ethylstyrene, acrylonitrile, butyl acrylate, butyl methacrylate, vinyltoluene, vinylnaphthalene, octyl methacrylate, octyl acrylate, cetyl methacrylate, cetyl acrylate, ethyl methacrylate, ethyl acrylate, vinylbenzyl alcohol, vinylformamide and mixtures thereof.

* * * * *